United States Patent [19]

Stiever

[11] Patent Number: 4,724,706
[45] Date of Patent: Feb. 16, 1988

[54] FUEL TANK GAUGE

[75] Inventor: Michael E. Stiever, Germantown, Wis.

[73] Assignee: Kelch Corp., Cedarburg, Wis.

[21] Appl. No.: 945,030

[22] Filed: Dec. 22, 1986

[51] Int. Cl.$^4$ ............................................. G01F 23/66
[52] U.S. Cl. ........................................ 73/320; 116/228
[58] Field of Search ....................... 73/320, 319, 307; 116/228, 229

[56] References Cited

U.S. PATENT DOCUMENTS

| | | | |
|---|---|---|---|
| 711,521 | 10/1902 | Parmelee | 73/311 |
| 1,290,814 | 1/1919 | Weaver | 116/228 X |
| 1,344,663 | 6/1920 | Waldrep | 73/311 X |
| 1,366,214 | 1/1921 | Ritz-Woller | 73/320 |
| 1,371,395 | 3/1921 | Rast | 116/228 |
| 1,413,046 | 4/1922 | MacKenzie | 73/320 X |
| 1,457,471 | 6/1923 | Stivers | 73/320 |
| 1,950,142 | 3/1934 | Hastings et al. | 116/229 X |
| 3,168,904 | 2/1965 | Conover | 73/311 X |
| 4,078,430 | 3/1978 | Pemberton et al. | 73/311 |
| 4,129,039 | 12/1978 | Pignato | 73/320 X |

OTHER PUBLICATIONS

A one page Kelch advertisement entitled, "Kelch HT Series Gas Gauges", undated, admitted prior art.
Two pages of a Prop'R Products advertisement entitled, "Prop'R Mix Outboard Gas/Oil Ratio Gauge", dated 1985.

Primary Examiner—Daniel M. Yasich
Attorney, Agent, or Firm—Quarles & Brady

[57] ABSTRACT

There is disclosed a fuel tank gauge of the type having a sensor such as a float for sensing the level of fuel in the tank. The float drives a fuel level indicator. The indicator is visible from the exterior of the tank when the sensor is installed in the tank. A first scale is positioned adjacent to the indicator so that the position of the indicator relative to the first scale indicates the level of fuel in the tank. A second scale is also adjacent to the indicator so that the position of the indicator provides information with respect to the amount of oil needed to be added to the tank. Accurate gas/oil fuel mixtures can be prepared directly in the tank through the use of the invention.

1 Claim, 4 Drawing Figures

U.S. Patent
Feb. 16, 1988
4,724,706
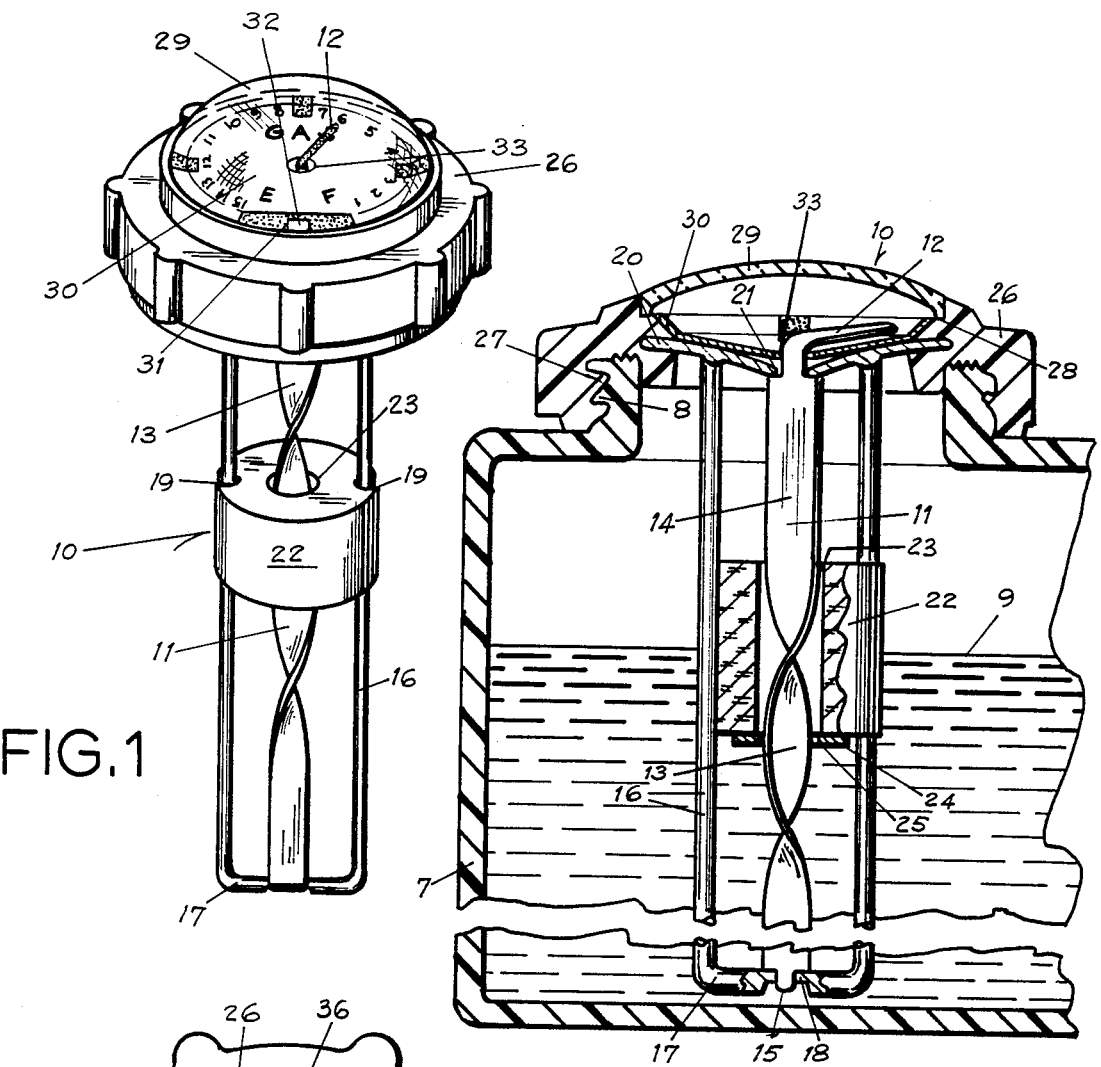
FIG. 1
FIG. 2
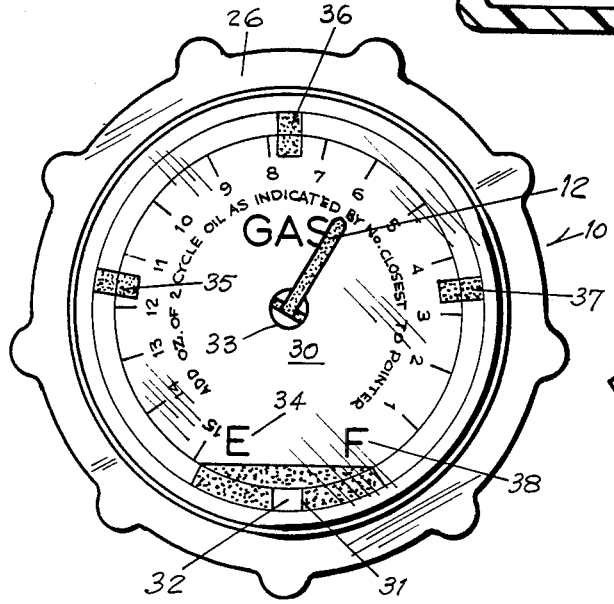
FIG. 3
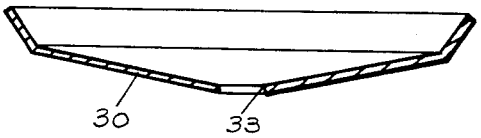
FIG. 4

FUEL TANK GAUGE

BACKGROUND OF THE INVENTION

A. Field Of The Invention.

The present invention relates to gauges used to measure the level of fuel in a fuel tank where the tank contains a gas/oil mixture. The gauge of the present invention provides information relating to how to refill such a tank with a specified gas/oil mixture of fuel.

B. Description Of The Art.

Various engines use a mixture of gas and oil as their fuel. For example, engines in lawn mowers, snow blowers, outboards, motorcycles, tractors, chain saws and golf carts often use a 50:1 gas/oil fuel. With such ratios, relatively small errors in mixing gas and oil can affect engine performance and wear. Further, even where the gas and oil are correctly mixed it is difficult to correctly estimate the amount of fuel required to fill the tank.

In practice, greater than the needed amount of fuel is often mixed and the excess must then be separately stored (thereby creating a safety hazard and/or taking up space) or wasted. Moreover, the typical means of mixing the fuel involves using a separate mixing container. This leads to waste (as well as to pollution problems if the mixing container is cleaned out).

Purchasing a commercially mixed gas/oil fuel is a possibility, but this leads to storage problems and to a lack of flexibility where different engines use different ratio fuel. More importantly, consumers often prefer to be able to mix the fuel from readily available supplies of gas (which many consumers store anyway for use with their automobile).

The art has developed a fuel tank dip stick which has along its side a conversion scale to provide information as to the amount of oil to be added prior to refilling the tank with gas. While this system is an improvement, it has its own problems. For example, the user should preferably wipe off the dip stick to obtain the most accurate reading, with the resulting undesirable residue on the wiping cloth. Further, differences in fuel viscosity, the manner that the dip stick is pulled out and inserted, and splashing can lead to inaccuracies. Also, the system is awkward and requires the user to leave the tank open longer than necessary while reading the dip stick. This is of concern from an air pollution standpoint.

It can therefore be seen that a need has existed for an improved means for filling a tank with a selected gas/oil ratio fuel mixture.

SUMMARY OF THE INVENTION

The invention relates to a fuel tank gauge. As is conventional, there is a means for sensing the level of the fuel, a means responsive to said sensing means for moving a fuel level indicator means, and a first scale positioned adjacent to said indicator means so that the position of the movable indicator means relative to the first scale can indicate the level of fuel in the tank.

In accordance with the present invention, there is also provided a second scale positioned adjacent to the movable indicator means so that the position of the indicator means relative to the second scale can indicate the amount of oil needed to be added to the tank to achieve, upon the addition of additional gas, a selected level for a selected gas/oil ratio fuel mixture. The second scale and the indicator means are visible from the exterior of the tank when the sensing means is installed in the tank.

Preferably, the indicator is a needle that rotates on a substantially vertical axis. In an especially preferred form, the needle and the two scales are positioned in a fuel tank cap, the sensing means is a float, and the responsive means is a rotatable spiral shaft.

The relative position of the indicator and second scale can provide information regarding the amount of oil to add to the tank before filling the tank the rest of the way with gas. In an alternative the second scale can provide information regarding how much oil to add after the gas has been added.

Since the information provided by the gauge is visible from the exterior of the tank, the tank need be kept open only for the minimum amount of time needed to pour the oil and gas into the tank. A separate mixing container is not required. Further, the informatin is accurate without regard to splashing or fluid viscosity.

The objects of the invention therefore include:
a. providing a fuel gauge of the above kind that indicates accurate information with respect to the amount of oil to be added to obtain a filled tank given a selected fuel ratio;
b. providing a fuel gauge of the above kind which has few parts and which is easy and inexpensive to manufacture; and
c. providing a fuel gauge of the above kind which can provide information visible from the exterior of the tank when the tank is in normal use.

These and still other objects and advantages of the present invention will be apparent from the description which follows. The preferred embodiment of the present invention will be described with reference to the accompanying drawings. These embodiments do not represent the full scope of the invention. Rather, the invention may be employed in other embodiments as well.

BRIEF DESCRIPTION OF THE DRAWINGS

FIG. 1 is a top perspective view showing an embodiment of the present invention;

FIG. 2 is a longitudinal sectional view of the gauge of FIG. 1, with the gauge being mounted in a fuel tank;

FIG. 3 is a top plan view of the gauge of FIG. 1; and

FIG. 4 is a sectional view taken on line 4—4 of FIG. 3 through the scale disc portion of the gauge.

DESCRIPTION OF THE PREFERRED EMBODIMENT

A fuel tank 7 has an externally threaded top opening 8. As shown in FIG. 2, a gas/oil mixture (50:1) is contained in the tank up to an unfilled level 9. The gauge (generally 10) has a rotatable vertical shaft 11 with a generally horizontal indicator needle 12 at its upper end. The shaft has a spiral section 13 at its lower end below a straight section 14.

Shaft 11 is rotatably mounted in a U-shaped carriage/guide 16 which has formed in its bottom segment 17 a hole 18 into which a peg 15 (which is integral with shaft 11) extends. Welded to the top of the carraige/guide 16 is a dish 20 having a central through hole 21 through which the needle 12 is linked to the shaft portion 14.

Float 22 has a round central bore 23 in which the shaft portion 13 rotates. On its lower end is provided a disc 24 having a thin rectangular slot 25. Float 22 also has two vertical guide slots 19 along its sides to receive the vertical legs of the carriage 16.

Cap 26 has inner threads 27 that mesh with the threads on extension 8 of the fuel tank. Plate 20 can be molded into or inserted into the cap 26. Cap 26 is also provided with an upwardly open dished surface 28 over which is positioned a transparent cover 29 and an indicator scale disc 30. Disc 30 has a notch 31 at one end which is suitable to receive projection 32 formed on the upper surface of cap 26. This aligns the disc.

Disc 30 also has a central hole 33 through which the indicator needle 12 is linked to the shaft portion 14. As best seen in FIG. 3, the top of the disc 30 has printed on it the usual gas level markings E(34), ¼, ½, ¾ (35, 36, 37), and F(38). This provides a first scale positioned adjacent to the indicator needle 12 so that the position of the indicator needle relative to the first scale can indicate the level of fuel in the tank.

A second scale is also positioned adjacent to the indicator needle 12 on the top surface of the disc 30. As best seen in FIG. 3, this takes the form of a series of ounce markings (1-15) arranged in an arc (increasing from full towards the empty). The markings are positioned with respect to tank volume and needle position so that the numbers represent the amount of oil which must be added to the tank to fill the tank by first adding that amount of oil (and then filling the tank the rest of the way with gas) if one wishes to achieve a 50:1 gas/oil ratio in the resulting mixture.

As seen in FIG. 3, if one views the needle 12, one would see that six ounces of oil must first be added to the tank. One should fill the tank the rest of the way with gasoline. The scale will be set up for each type of tank and gauge.

In operation, the float 22 follows the level of the tank on the guide legs of the carriage 16. When the float rises or falls, it will drive the spiral section 13 of the shaft, thereby causing the needle 12 to rotate. The holes 18, 21 and 33 provide a mounting for the shaft which allows it to rotate without vertical movement. The means for sensing the level of fuel in the tank in this embodiment is therefore the float 22, and the means for moving the indicator means 12 is the interaction of the slot 25 with the spiral 13.

It should be noted that one might instead decide to arrange the ounce markings so that they provide information to allow one to first add gas to a given level, and then add the specified amount of oil (or fill the rest of the way with oil). Such a system is not the especially preferred one because adding oil first provides a better mixture. However, it is part of the invention.

Also, when adding oil first, one might set up the scale so that the gas is to be added up to a psuedo-fill level, rather than the absolute top of the tank. A third scale can also be added which provides the specific volume of gas to be added. It will also be appreciated that while a rotatable needle is shown, other types of movable indicators (e.g., a needle that moves in a straight line) might also be used.

Thus, there may be variations to the preferred embodiments which are within the scope of the invention. The claims are therefore not to be limited to the specific preferred embodiment discussed herein.

I claim:

1. In a fuel tank gauge of the type having a float for sensing the level of fuel in a fuel tank, a rotatable spiral shaft controlled by the float for rotating a fuel level indicator needle on a substantially vertical axis, and a first stationary scale of fuel level markings positioned adjacent to said needle so that when the float is positioned in the fuel tank the portion of the scale to which the needle points indicates the level of fuel in the fuel tank, an improvement comprising:

a second stationary scale having volume markings positioned adjacent to said same needle so that when the float is positioned in the fuel tank the portion of the second scale to which the needle points indicates the volume of oil needed to be added to the fuel tank to raise the fuel level in the tank to achieve, upon the addition of additional gas to a predetermined fill level, a predetermined fill level in the fuel tank for a predetermined gas/oil ratio fuel mixture for that tank;

said needle and scales being positioned in a fuel tank cap so as to be capable of being visible from the exterior of the fuel tank when the float is installed in the fuel tank;

said cap having an upper transparent wall, a side wall, and a lower substantially horizontal wall, said lower wall having a through hole through which the shaft extends, said upper, side, and lower walls forming a cage for the needle;

both of said scales being in an arc pattern on the upper side of said lower wall around said substantially vertical axis; and said first scale having the indicated level decrease in one direction around the arc, and said second scale having the indicated volume increase in that same direction;

whereby the lower wall substantially separates said needle and scales from the fuel in the tank.

* * * * *